June 4, 1946.	J. F. JOHNSON	2,401,646
TEMPERATURE CONTROL FOR COOLING FLUID
OF INTERNAL-COMBUSTION ENGINES
Filed Feb. 28, 1945

INVENTOR.
JOHN FRANK JOHNSON
BY
Earl V. Chappell
ATTORNEYS.

Patented June 4, 1946

2,401,646

UNITED STATES PATENT OFFICE 2,401,646

TEMPERATURE CONTROL FOR COOLING FLUID OF INTERNAL-COMBUSTION ENGINES

John Frank Johnson, Ludington, Mich.

Application February 28, 1945, Serial No. 580,248

5 Claims. (Cl. 123—178)

This invention relates to improvements in temperature control for cooling fluid of internal combustion engines.

The main objects of this invention are:

First, to provide a means for circulating and regulating the temperature of the cooling water of internal combustion engines, particularly marine engines.

Second, to provide a circulating and temperature control mechanism in which the temperature can be effectively controlled under a very wide range of operating conditions.

Objects relating to details and economies of the invention will definitely appear from the description to follow. The invention is defined in the claims.

A structure which embodies the features of the invention is clearly illustrated in the accompanying drawing, in which.

Figure 1:
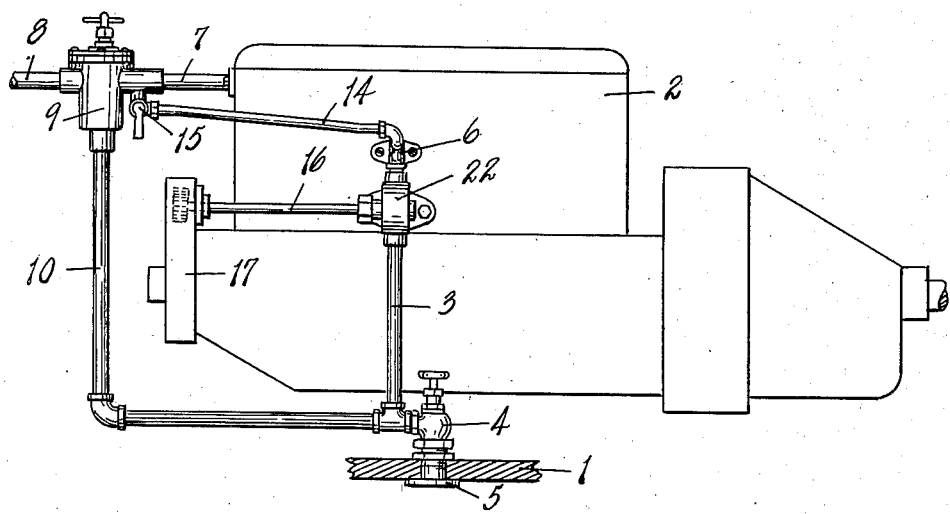
Fig. 1 is a fragmentary side elevation of an embodiment of my invention as applied or adapted to a marine internal combustion engine, various parts being shown conventionally.
Figure 2:
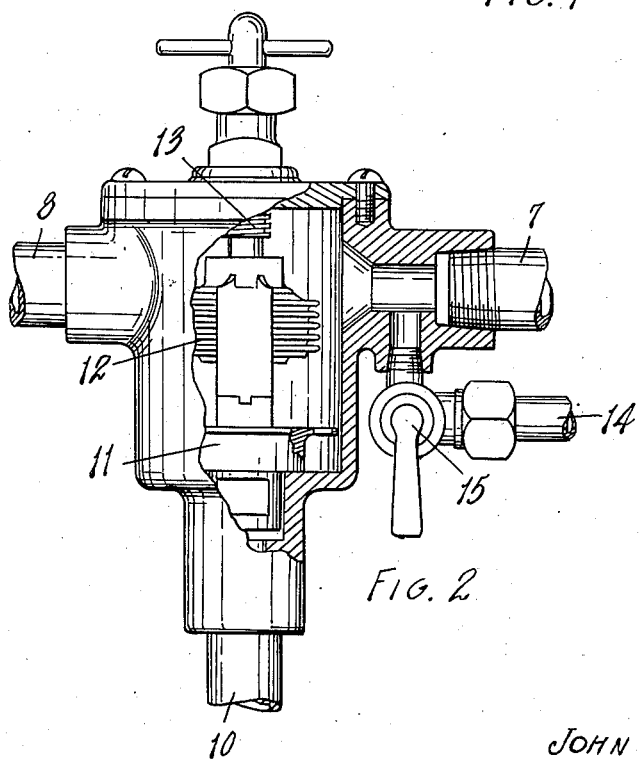
Fig. 2 is an enlarged fragmentary view partially in vertical section of the thermstatic or thermally controlled valve and showing its relationship to a recirculation conduit and a by-pass conduit constituting parts of the invention.

In the accompanying drawing 1 represents the bottom of a boat and 2 an internal combustion engine. The internal combustion engine is provided with a water jacket or cooling fluid chamber as is conventional with such engines. The pump 22 is provided with an intake or inlet pipe 3 having an inlet valve 4, the inlet 5 of the valve opening below the bottom of the boat. Such valves are commonly called seacocks. The pump discharge indicated at 6 communicates with the cooling jacket or chamber of the engine. The discharge pipe 7 for the cooling jacket has an overboard delivery extension 8. The valve casing 9 is connected to the discharge 7 and is also connected by the recirculation pipe or conduit 10 to the pump intake 3, this connection to the pump intake being at the rear of the valve 4.

The valve 11 within the casing 9 is provided with a thermostatic actuating or control element 12, that illustrated being of the bellows type. The thermostatic control element 12, upon an increase in temperature of the water passing through discharge 7 from the water jacket of the engine tends to close the valve 11. This decreases the flow through the recirculating conduit 10 and increases the flow of cool water from beneath the boat, through the inlet valve 4 to and through the water jacket so as to lower the temperature of the engine. A decrease in temperature of the water passing through the discharge 7 tends to reverse the above described action so as to increase the temperature of the engine. The internally adjustable thrust member 13 coacts with the thermal element so that by adjustment of the thrust element the thermally actuated valve is adjusted and consequently the recirculation of the water is controlled by the variations in temperature of the discharged water.

To further control the temperature I provide a by-pass or shunt connection 14 from the discharge of the pump to the water jacket discharge 7, the connection to the discharge 7 being in advance of the recirculation valve so that the thermal element of the recirculation valve is subject to the temperature of the water flowing through the water jacket and also that flowing through the shunt or by-pass connection. This by-pass connection 14 allows a small part of the circulating water to act directly on the thermostatic control element 12 long before the main portion has passed through the water jacket thereby acting on the thermostatic control element 12 in advance, whereby the cool water pumped from below the boat acts on the thermostatic control element 12 to cause the same to more widely open the valve 11 to permit subsequent increased flow through the recirculation pipe 10. This flow through the shunt or by-pass 14 prevents fluctuation or surge in temperature, especially when the motor idles for long periods. The manually controlled valve 15 provides an effective control and regulation for the by-passed water. The pump is driven from the shaft 16, driving gearing or connections to the crank shaft of the engine being within the housing or gear box 17.

With the parts thus arranged and associated and operating as above described a very effective and accurate control may be had for the cooling water, and the intake valve 4 may be adjusted to varying conditions of intake water temperature, the temperature of the surrounding atmosphere, and the like. The thermal valve acts automatically but is manually adjustable for a considerable range of conditions. The valve 15 may be manipulated to control the amount of water circulating through the water jacket.

I have illustrated and described an embodiment of my invention which is very simple and practical. I have not attempted to illustrate various embodiments and adaptations which I contemplate as it is believed this disclosure will enable those skilled in the art to embody or adapt my invention as may be desired.

While my improvements are particularly desirable for use in internal combustion marine engines, they are also adapted for use in other relations, particularly on large engines where the supply of cooling water exceeds that which can be effectively cooled by means of a radiator for example, as used in automotive vehicles and consequently involving a source of water supply.

Having thus described my invention what I claim as new and desire to secure by Letters Patent is:

1. In a temperature control for marine internal combustion engines including a water cooling jacket, the combination of a pump having a discharge connection to the jacket and an intake connection provided with a seacock, an overboard discharge conduit for said water jacket, a recirculation conduit for said discharge connected to said pump intake connection at the rear of said seacock, a thermally controlled valve for said recirculation conduit, the thermal element of which is subject to the discharge of said jacket, means for adjusting said thermally controlled valve for varying the temperature at which the recirculation valve is actuated to closed position by its thermal element, a water jacket bypass connection for the discharge of the pump to the said discharge conduit connected to the discharge conduit in advance of the said thermal element controlled valve whereby it is subject to the combined discharge from the water jacket and said bypass, and a manually adjustable control valve for said bypass connection.

2. In a temperature control for marine internal combustion engines including a water cooling jacket, the combination of a pump having a discharge connection to the jacket and an intake connection provided with a seacock, an overboard discharge conduit for said water jacket, a recirculation conduit for said discharge connected to said pump intake connection at the rear of said seacock, a thermally controlled valve for said recirculation conduit, the thermal element of which is subject to the discharge of said jacket, a water jacket bypass connection for the discharge of the pump to the said discharge conduit connected to the discharge conduit in advance of the said thermal element controlled valve whereby it is subject to the combined discharge from the water jacket and said by-pass, and a control valve for said bypass connection.

3. In a temperature control for marine internal combustion engines including a water cooling jacket, the combination of a pump having a discharge connection to the jacket and an intake connection provided with a seacock, an overboard discharge conduit for said water jacket, a recirculation conduit for said discharge connected to said pump intake connection at the rear of said seacock, a thermal element controlled valve for said recirculation conduit, and a water jacket by-pass connection for the discharge of the pump to the said discharge conduit connected to the discharge conduit in advance of the said thermal element controlled valve whereby it is subject to the combined discharge from the water jacket and said by-pass.

4. In combination with the cooling chamber of an internal combustion engine, a pump having a discharge connection to said chamber and an intake connection to a source of water supply provided with a manually adjustable inlet valve, a discharge conduit for said chamber, a recirculation connection from said discharge connected to said pump at the rear of its said inlet valve, a control valve for said recirculation connection having a thermal element subject to the water discharged from said chamber, means for manually adjusting said thermally controlled valve for varying the temperature at which the recirculation valve is actuated to closed position by its thermal element, a bypass connection for said cooling chamber connected to the discharge of the pump and to said chambered discharge in advance of said recirculation valve whereby the thermal element is subject to the combined discharge from the cooling chamber and said bypass, and a control valve for said bypass.

5. In combination with the cooling chamber of an internal combustion engine, of a pump having a discharge connection to said chamber and an intake connection to a source of water supply provided with a manually adjustable inlet valve, a discharge conduit for said chamber, a recirculation connection from said discharge connected to said pump at the rear of its said inlet valve, a control valve for said recirculation connection having a thermal element subject to the water discharged from said chamber, and a bypass connection for said cooling chamber connected to the discharge of the pump and to said chambered discharge in advance of said recirculation valve whereby the thermal element is subject to the combined discharge from the cooling chamber and said bypass, and a control valve for said bypass.

JOHN FRANK JOHNSON.